Reissued Jan. 9, 1951

Re. 23,325

UNITED STATES PATENT OFFICE 23,325

METHOD AND COMPOSITION FOR THE TREATMENT OF AIR

Guy S. Paschal, Sarasota, Fla., assignor, by mesne assignments, to Airkem, Inc., New York, N. Y., a corporation of New York No Drawing. Original No. 2,326,672, dated August 10, 1943, Serial No. 378,375, February 11, 1941. Application for reissue August 9, 1944, Serial No. 548,781

7 Claims. (Cl. 21—53)

Matter enclosed in heavy brackets [ ] appears in the original patent but forms no part of this reissue specification; matter printed in italics indicates the additions made by reissue

This invention relates generally to a treatment for improving the condition of the air in a confined space such as a room or chamber. More specifically it relates to a substance employed in such treatment and to the manner of its production.

The treatment in accordance with my invention involves the employment of chlorophyll. This term "chlorophyll" as herein used is not to be interpreted in such technical or limited sense as to exclude agents or compositions of matter which are chlorophyll in modified form or chlorophyll in combination and in which the chlorophyll is so associated as to be free to function for the attainment of the objects of my invention.

Chlorophyll functions in the physiology of plant life in effecting, by catalysis, the conversion of carbon dioxide and water into carbohydrates. My invention is not concerned with this transformation but with another use of this substance.

I have discovered that chlorophyll dispersed in air imparts thereto a stimulating invigorating quality that resembles fresh country air in its effect on people breathing it, to give a sense of well-being even where the confined air has become vitiated, as where people are in a room without sufficient ventilation.

It is one of the objects of my invention to refresh the atmosphere in a confined space. This object I attain by dispersing chlorophyll in such an atmosphere.

[I have further discovered that, where I employ chlorophyll in this manner for refreshing the atmosphere of a confined chamber, therapeutic conditions such as colds are beneficially affected or even prevented, apparently because of some physiological effect which the chlorophyll has upon the mucous membrane of the respiratory passage. It is my thought that these beneficial therapeutic effects are due to a catalytic action parallel to what occurs in plants, and which makes possible or hastens certain chemical reactions in the exposed mucous membrane or in the associated tissues.]

While I have discussed the freshening effect of chlorophyll on air as an action on the air itself, it is of course possible that the effect is a subjective one, resulting from the action of the chlorophyll in the air on the tissues of the human body rather than on the air, and that the treatment of air which is breathed may therefore be described as an indirect treatment of mucous membrane.

I have found that the handling of chlorophyll for the purposes of attaining my invention presents the difficulty that it is relatively inactive and requires considerable quantities to effect the purposes above described and is difficult to handle. It is therefore a further object of my invention to make provision to activate the chlorophyll so that relatively small quantities are required, and this object I attain by associating formaldehyde with chlorophyll because I have discovered that formaldehyde has the peculiar characteristic that when combined with chlorophyll it permits the chlorophyll to be used more efficiently and effectively for the attainment of my invention.

While chlorophyll serves as an atmospheric refreshant, it does not appear to have any germicidal effect nor does it appear to affect atmospheric odors. Formaldehyde, on the other hand, has a germicidal effect and does counteract and destroy odors, but is itself an irritant and a depressant, and has a characteristic odor of its own which is disagreeable to many people. Its action in counteracting and destroying atmospheric odors is apparently a chemical reaction with odor substances in the vapor phase, which results in a decrease in the odor intensity, dependent upon the amount of formaldehyde used, until a neutral point is reached at which the atmospheric odors have been entirely removed. Any increase in the amount of formaldehyde beyond this point will increase the formaldehyde atmosphere, and again create an undesirable condition. While formaldehyde possesses this odor-destroying property, I have found that at the neutral point mentioned hereinabove, the air, while odorless, is "flat," or vitiated, that is to say, it lacks the characteristic of "freshness" which is associated with country or seashore air. This lack of freshness is supplied by the chlorophyll in accordance with my invention and in this manner a further object of my invention is attained.

While, for the reasons stated, the association with chlorophyll of formaldehyde is highly desirable, because of the advantages that result from that association, it is to be understood that the broader purposes of my invention can be effected by the use of the chlorophyll without its being associated with formaldehyde as, for example, where the benefits of that association are either not required or desired.

A wide field of use for my invention is in the air conditioning industry. The air delivered by air conditioning systems has a peculiar stale character of its own, which may be due to odors of "below threshold value," that is, odors of such low intensity that they give no positive odor impression. Even at such low intensity they may act as depressants, which treatment of the air according to my invention may counteract.

The odors found in these systems, whether noticeable or "below threshold value" have been found to be due partly to bacteria and mold which, in the absence of natural light, develop in deposits of air-borne solids on coils, filters, duct walls, drip pans and drains, and which cause putrefaction resulting in a dank odor. Another source of these odors is the absorption, by dust collecting on filters and duct walls, of odors carried through the system by recirculated air and given off again by said dust. A third cause of odor is that contributed by insulating materials, adhesives, viscous filter material, and particularly corroding metallic surfaces.

The cumulative effect of these odors, even where it is "below threshold value," is sufficient to impart a character to the air that is depressive.

By the treatment of air in such a system in accordance with my invention this condition is corrected by its sterilizing action, [which destroys germs and odors in the system, as well as disease germs, such as those causing colds, which may be carried into the system and contribute to the spreading of disease by recirculating them,] and further by the introduction of a freshening agent into the system.

I will here give the steps I employ in arriving at an association of chlorophyll and formaldehyde whereby the objectives of my invention are attained. For a solution in a gallon of solvent, I mix three ounces of chlorophyll into a one gallon solution of water and ethyl alcohol, the mixture being stirred slightly. Sixteen ounces of commercial formaldehyde are added slowly, the solvent being agitated violently while being maintained at a temperature of 80° to 85° F. Commercial formaldehyde is generally a 40% solution in water. The solution thus arrived at is intended for treatment of the air of a confined space and its dispersion is effected for example, by spraying from a closed container or by evaporation from an open container. *Accordingly the process for freshening air comprises dispersing from chlorophyll, a solution containing chlorophyll or a solution containing formaldehyde and chlorophyll, into the air, an emission having the capacity and in such amount as to cause freshening of the air.*

The disclosure that has just preceded setting forth the details of a manner for associating the ingredients will be understood to be merely for exemplification and therefore not in a limitative sense unless otherwise expressly specified by the language of the claims.

Having thus described my invention and illustrated its use, what I claim as new and desire to secure by Letters Patent is:

[1. The process of treating the air in a confined space to freshen it that comprises the step of causing chlorophyll to be diffused into said space.]

[2. The process of treating the air in a confined space to freshen it that comprises the step of causing a solution of chlorophyll and formaldehyde to be diffused into said space.]

3. The process of treating the air in a confined space that comprises the step of dispersing into said space, a solution containing chlorophyll and formaldehyde in the proportions quantitatively of approximately 3 of the former to 16 of the latter in 40% commercial solution.

4. The process of treating the air in a confined space to freshen it that comprises the step of causing a solution of chlorophyll to be diffused into said space by spraying the solution into said space.

[5. The treatment of air circulating in an air conditioning system which comprises the steps of causing diffusion into said circulated air of a mixture of chlorophyll and formaldehyde.]

6. The treatment of air circulating in an air conditioning system which comprises the steps of causing diffusion into said circulated air of a mixture of chlorophyll and formaldehyde by spraying said mixture into the air.

[7. For use in an air conditioning system a circulating medium constituted by air having dispersed therein a mixture of chlorophyll and formaldehyde.]

8. An air freshing composition for use in the treatment of air in a confined space comprising chlorophyll and formaldehyde in solution [for diffusion in said space.].

*9. An air freshing composition for use in the treatment of air in a confined space comprising a chlorophyll and formaldehyde composition.*

*10. The process for freshing air in a confined space that comprises dispersing chlorophyll into the air in said space by spraying.*

*11. The process for freshening air in a confined space which comprises dispersing chlorophyll into the air in said space in such an amount as to cause freshening of the air in said space.*

GUY S. PASCHAL.

REFERENCES CITED

The following references are of record in the file of this patent or the original patent:

UNITED STATES PATENTS

| Number | Name | Date |
|---|---|---|
| 1,852,004 | Dunn | Apr. 5, 1932 |
| 1,852,231 | Bryner | Apr. 5, 1932 |
| 2,120,667 | Gruskin | June 14, 1938 |

FOREIGN PATENTS

| Number | Country | Date |
|---|---|---|
| 436,791 | Great Britain | Oct. 14, 1935 |
| 444,276 | Great Britain | Mar. 18, 1936 |
| 665,707 | Germany | Oct. 1, 1938 |

OTHER REFERENCES

Moure, La Presse Medicale, July 24, 1935, pages 1172–1174.

Pauling, Chemical and Engineering News, October 13, 1947, page 2970.

Briggs, "Summary and Conclusions from Report on the Products Sold under the Trade Names "Air-Wick" and "Airkem." Joint Report from the National Bureau of Standards and the National Institute of Health to the Federal Trade Commission, Washington, D. C., May 5, 1944, 5 pages.

Consolazio et al., Heating, Piping and Air Conditioning, March 1947. American Society of Heating and Ventilating Engineers Journal Section, pages 103–117.

De Navarre, American Perfumer and Essential Oil Review, May 1944, page 31.

DiGiorgio, Chemical and Engineering News, page 3322, November 10, 1947.

Wilkstatter et al., Investigations on Chlorophyll, Translation by Shertz et al., 1913, page 68.

Bennett, H., "The Chemical Formulary," volume III, page 105 (1936), and Vol. I, page 149 (1933), published by D. Van Nostrand, N. Y.

Pharmacopoeia by Martindale and Wescott—Vol. 1, 20th Ed. 1932—pp. 122 to 127.